United States Patent [19]  
Fassler

[11] 3,992,744  
[45] Nov. 23, 1976

[54] LIQUID ACTUATED RECIPROCATING SHOWER BRUSH
[76] Inventor: Friedbert Fassler, 1 Partridge Square, Oswego, Ill. 60543
[22] Filed: June 20, 1975
[21] Appl. No.: 588,655

[52] U.S. Cl. .............................. 15/22 R; 51/170 TL
[51] Int. Cl.² ........................................ A46B 13/06
[58] Field of Search ............. 15/22 R, 22 A, 29, 97; 128/53, 62 R, 62 A; 51/170 TL

[56] References Cited
UNITED STATES PATENTS
2,678,457  5/1954  Demo et al. ........................... 15/29
3,443,271  5/1969  Lyons ................................. 15/22 R FOREIGN PATENTS OR APPLICATIONS
1,184,427  2/1959  France ............................... 15/22 R Primary Examiner—Edward L. Roberts
Attorney, Agent, or Firm—Foorman L. Mueller

[57] ABSTRACT

An improved shower brush having a reciprocating head includes a housing, a liquid inlet to the housing, and a turbine member positioned to be rotated by liquid entering the housing through the inlet. A brush drive plate is slidably mounted on the housing and confined within a chamber of the housing. The brush drive plate has a surface facing the turbine member, with the surface having a cam slot in it. A pin is mounted on the turbine member and extends into the cam slot on the brush drive plate. The cam slot has a configuration such that rotary motion of the turbine member is converted to reciprocating motion of the brush drive plate. A massage brush head is mounted on the brush drive plate. The brush also has a plurality of discharge orifices from the housing disposed around the brush head and means forming a part of the housing for distributing the liquid to the discharge orifices after it causes the turbine member to rotate so that the shower brush may massage and shower the user at the same time.

10 Claims, 2 Drawing Figures

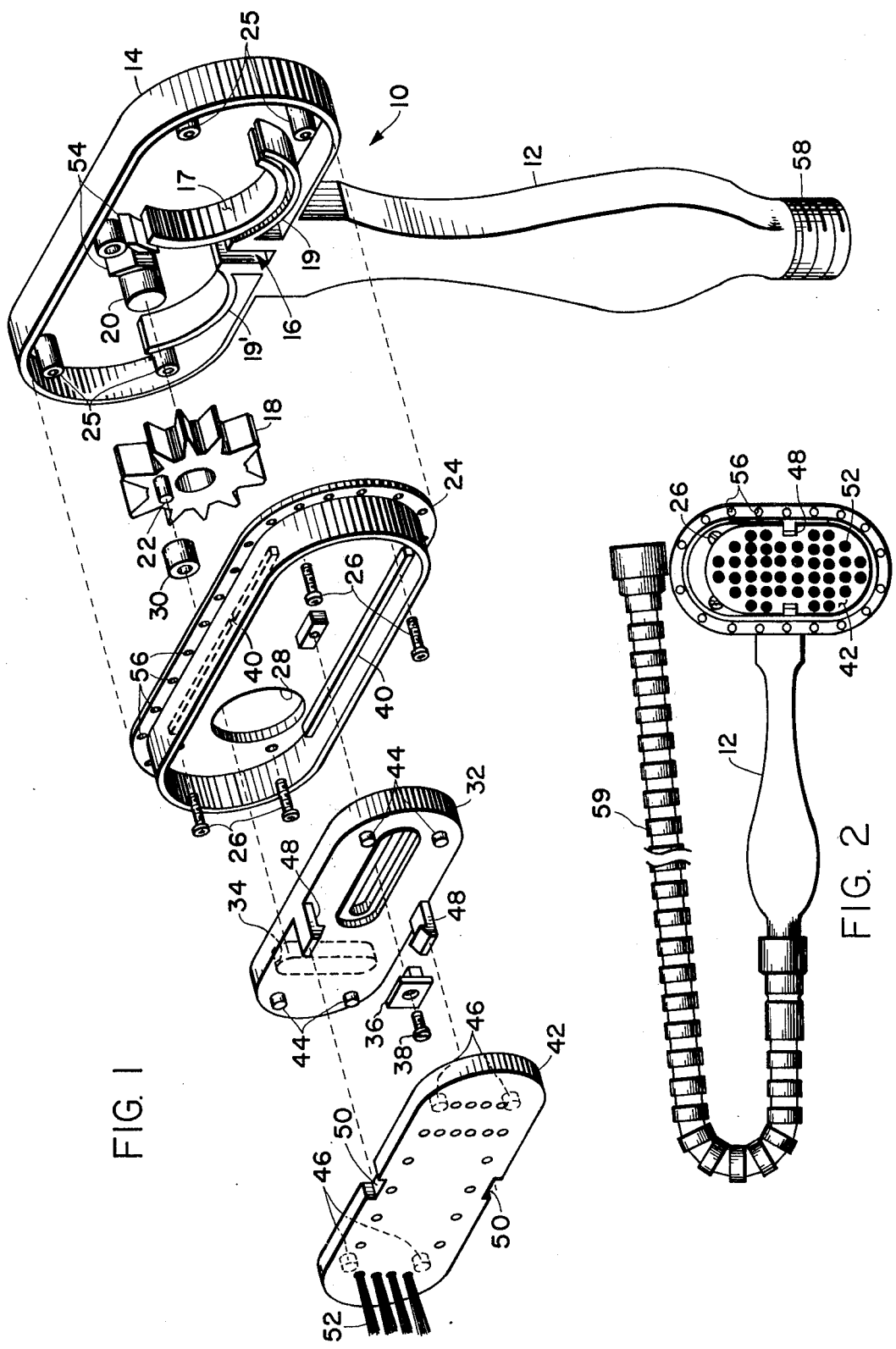

3,992,744

LIQUID ACTUATED RECIPROCATING SHOWER BRUSH

FIELD OF THE INVENTION

This invention relates to a brush in which force imparted by flowing water or other liquid is used to cause a brush head to move in a reciprocating manner. More particularly, it relates to such a brush in which a simple camming action is used to convert rotary turbine motion to reciprocal motion. Most especially, it relates to such a brush adapted for use as a personal care shower brush.

DESCRIPTION OF THE PRIOR ART

It has long been recognized that a brush which is capable of providing cleaning fluid and scrubbing action to an area to be cleaned has significant advantages in cleaning ease. For example, rotary brush fixtures attachable to a hose for washing an automobile are well known. However, such rotary brushes have not achieved acceptance for use in personal care, since a rotary brush motion often results in entangling of body hair and resulting discomfort to the user.

Recognizing the unsuitability of prior art rotary brushes, it has been proposed to use a reciprocating motion of the brush rather than a rotary motion. However, prior art designs for doing this have neither been easy to manufacture nor reliable in operation. A need therefore remains for an improved combination liquid actuated reciprocating brush and shower unit.

SUMMARY OF THE INVENTION

Accordingly, it is an object of this invention to provide a liquid actuated reciprocating brush of simplified construction which simultaneously provides both a massage and shower unit.

It is another object of the invention to provide a reciprocating brush powerful enough for effective cleaning and massage, yet gentle enough for use on any part of the body.

It is still another object of the invention to provide such a brush in which excessive pressure applied to the bristles stalls the unit rather than injuring either the user or the mechanism of the brush.

These and related objects may be achieved through use of the novel liquid actuated reciprocating brush herein disclosed. The brush has a housing and a liquid inlet to the housing. A turbine member is positioned to be rotated by liquid entering the housing through the inlet. A brush head is slideably mounted on the housing. A drive means including a pin and cam slot is directly connected to the turbine and has the brush head detachably mounted thereon such that the drive means operatively connects the turbine member and the brush head. The pin is mounted on the turbine member and extends into the cam slot formed in a drive plate on a back surface of the brush head. The cam slot has a configuration such that a rotary motion of the turbine member is converted to reciprocating motion of the brush head. Discharge orifices for the water or other liquid are contiguous to the brush head on the housing. Flow diverters or other means forming a part of the housing distribute the liquid to the discharge orifices after it causes the turbine member to rotate, thus providing both a massage and a shower facility in the same unit.

This reciprocating brush head imparts a powerful enough scrubbing action for effective cleaning and massage of the body, but will stall rather than injure the user or damage the brush unit if a sufficient amount of pressure is applied to the bristles of the brush which would otherwise result in injury to the user.

The attainment of the foregoing and related objects, advantages and features of the invention should be readily apparent after consideration of the following more detailed description of the invention in which:

BRIEF DESCRIPTION OF THE DRAWINGS

FIG. 1 is an exploded perspective view of an embodiment of the invention; and

FIG. 2 shows the complete assembled unit illustrated in FIG. 1, looking at the face of the brush and including a flexible hose for connection to a water supply.

DETAILED DESCRIPTION OF THE INVENTION

The drawings show an embodiment of a liquid actuated reciprocating massage brush and shower facility in accordance with the invention. Housing 10 includes a handle portion 12 and a top portion 14. Water inlet 16 leads from handle portion 12 to top portion 14, and impinges on the back side of water guide 17, which guide is spaced away from a second water guide 19, which with guide wall 19' directs the water within the main body of the housing portion 14. Turbine 18 is rotatably mounted on shaft 20 in top portion 14. Pin 22 is mounted on turbine 18. Cover 24 is fastened to the remainder of top portion 14 of housing 10 by means of screws 26 fitting into threaded bores 25. Cover 24 has an opening 28 large enough to accommodate the path of rotation of pin 22. Bushing 30 is rotatably mounted on pin 22 extending through opening 28 of cover 24.

The rotary motion of the turbine 18 is converted to reciprocating motion in the brush drive plate 32 which has a vertically oriented cam slot 34 in which bushing 30 rides. Brush drive plate 32 is slideably mounted on cover 24 by means of retainer 36 and screw 38. Guide flanges 40 on cover 24 aid in defining the path of travel of brush drive plate 32. Brush head 42 is removeably mounted on brush drive plate 32 by means of pins 44 on drive plate 32, which fit into recesses 46 on the back of brush head 42, and by projections 48 on brush drive plate 32, which fit into recesses 50 on brush head 42. This arrangement allows ready replacement of brush head 42 with other brush heads having bristles 52 that have varying hardness characteristics for different uses. Easy removal of the brush head 42 also facilitates its cleaning. Flow diverters 54 are mounted on top portion 14 of housing 10 opposite water inlet 16, and with the portions 17, 19, and 19' provide the direction of water flow within the chamber in the top portion 14. Holes 56 around the periphery of the cover 24 provide an outlet for the water from the top portion 14 of housing 10 so that the unit serves as a shower as well as massage brush, and supplies multiple jets of water on the body where the brush is used for cleaning and massage. Handle 12 has screw threads 58 for attaching a hose 59 or other source of water. A conventional flexible hose 59 is utilized in the complete unit illustrated in FIG. 2.

In operation, water enters the housing 10 through handle 12 to inlet 16. The water flow causes turbine 18 to rotate, thus causing pin 22 to describe a circular path of rotation. Pin 22 and bushing 30 therefore move up and down in cam slot 34 and impart an oscillatory horizontal component of force to drive plate 32. Guide flanges 40 on cover 24 help to define the reciprocating motion of brush drive plate 32. After the water has caused turbine 18 to rotate, flow diverters 54 divide the water stream into separate streams for distribution in top portion 14 of housing 10 and ejection as jets through holes 56 in cover 24 directly onto the body of the user of the shower brush.

In practice, it has been found that a clearance of 0.005 inches between the top and bottom sides of brush drive plate 32 and guide flanges 40 gives a simple reciprocating motion to the brush drive plate. A looser fit, for example a clearance of 0.050 inches between the guide flanges 40 and the top and bottom surfaces of drive plate 32 causes the drive plate to move in an elongated figure 8 motion. Either form of motion has been found suitable for this invention.

In use, a shower brush having the configuration shown in the different elements in FIG. 1, and in the assembled and operating condition in FIG. 2 provides a sufficiently powerful reciprocating action for effective cleaning and massage of the body. However, should an excessive pressure be applied on the bristles 52 against the body, the reciprocal motion of the brush head 42 will stall rather than damage the mechanism, or injure the user.

It should now be apparent that a liquid actuated reciprocating brush capable of attaining the stated objects of the invention has been provided. The brush is of simplified construction and is effective for cleaning and massage, yet will not result in injury to the user. It should further be apparent that various modifications can be made in the design as shown. For example, the venturi method of dispensing soap, wax, or other active ingredients into the water or other liquid stream can be employed with the invention. While the invention has been described for use in personal care, the features of this invention should make it of use in other applications as well, and with other cleaning liquids than water. It is intended that all modifications of the invention as described above be covered within the spirit and scope of the claims appended hereto.

What is claimed is:

1. A brush having a reciprocating head, which comprises:
   a. a housing,
   b. a liquid inlet to said housing,
   c. a turbine member positioned in said housing to be rotated by liquid entering said housing through said inlet,
   d. a cover for said housing having an aperture therein,
   e. a brush drive plate slideably mounted on said housing cover, said brush drive plate having a surface facing said turbine member, and the surface having a cam slot therein,
   f. a pin mounted on said turbine member and extending through the aperture in said cover and into the cam slot on said brush drive plate, the cam slot having a configuration such that rotary motion of said turbine member is converted directly to reciprocating motion of said brush drive plate, and
   g. a brush head mounted on said brush drive plate.

2. The brush of claim 1 additionally comprising:
   h. a plurality of discharge orifices from said housing contiguous to said brush head, and
   i. means forming a part of said housing for distributing the liquid to said discharge orifices after the liquid causes said turbine member to rotate.

3. The brush of claim 2 in which said liquid distributing means comprises at least a pair of flow diverting members positioned in said housing downstream of said fluid inlet from said turbine member.

4. The brush of claim 1 in which said brush head is releasably mounted on said brush drive plate.

5. The brush of claim 1 in which said housing cover includes a pair of guide flanges along which said brush drive plate slides in operation, the clearance between said brush drive plate and the flanges being such that said brush drive plate moves with an essentially linear reciprocating motion.

6. The brush of claim 1 in which said housing includes a pair of guide flanges along which said brush drive plate slides in operation, the clearance between the flanges and said brush drive plate being such that said brush drive plate moves with a figure 8 reciprocating motion.

7. The brush of claim 1 in which the housing includes means forming a part of said housing for distributing liquid therein to drive said turbine and provide shower liquid to be discharged from said housing, said means including a liquid guide portion against which the liquid impinges upon entering said housing, a second guide portion adjacent the turbine member, and at least a pair of flow diverting members positioned in said housing downstream of said fluid inlet from said turbine member.

8. In a hydraulically operated brush and liquid discharging unit, the combination of:
   a. a housing,
   b. a liquid inlet to said housing,
   c. a turbine member positioned in said housing to be rotated by liquid entering said housing through said inlet,
   d. a reciprocating brush head,
   e. cover means connected to said housing forming a chamber therein in which said turbine member is mounted and operated, and forming a chamber from which liquid is discharged through a plurality of orifices spaced in a pattern around and outside said reciprocating brush head,
   f. drive means for driving said brush head in a reciprocating motion including a reciprocably movable plate which is releasably connected with said brush head and including means for operatively connecting said turbine member and said plate comprising structure that includes a pin connected in said turbine and a slot in said plate extending transversely to the direction of reciprocating movement of said plate, with said pin moving longitudinally in said slot to convert rotary motion in said turbine to reciprocating motion in said plate, and
   g. means for releasably and directly connecting said brush head and said plate.

9. The brush of claim 8 wherein said cover means, said brush head, and said drive means are each separable from one another and from said housing.

10. In the brush of claim 8 wherein said plurality of discharge orifices are provided from said housing and surrounding said brush head, and means are provided forming a part of said housing for distributing the liquid to said discharge orifices after the liquid causes said turbine member to rotate.

* * * * *